US010047679B2

(12) United States Patent
Jiang et al.

(10) Patent No.: US 10,047,679 B2
(45) Date of Patent: Aug. 14, 2018

(54) SYSTEM AND METHOD TO ENHANCE LEAN BLOWOUT MONITORING

(71) Applicant: General Electric Company, Schenectady, NY (US)

(72) Inventors: Xiaomo Jiang, Atlanta, GA (US); Ilan Leibu, Atlanta, GA (US); Lijie Yu, Atlanta, GA (US); Devang Jagdish Gandhi, Atlanta, GA (US); Karen Warren Miller, Atlanta, GA (US); Matthew Everett Moore, Atlanta, GA (US); Ketan Kalele, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 15/182,381

(22) Filed: Jun. 14, 2016

(65) Prior Publication Data
US 2017/0356349 A1   Dec. 14, 2017

(51) Int. Cl.
*G01M 15/14* (2006.01)
*F02C 9/46* (2006.01)
*F01D 21/00* (2006.01)

(52) U.S. Cl.
CPC .............. *F02C 9/46* (2013.01); *F01D 21/003* (2013.01); *G01M 15/14* (2013.01); *F05D 2270/051* (2013.01); *F05D 2270/44* (2013.01)

(58) Field of Classification Search
None
See application file for complete search history.

(56) References Cited

U.S. PATENT DOCUMENTS

| 4,215,412 | A | 7/1980 | Bernier et al. |
| 6,247,310 | B1 * | 6/2001 | Norris ............... F02G 1/043 60/521 |
| 6,312,191 | B1 | 11/2001 | Rosenfeld |
| 7,454,892 | B2 * | 11/2008 | Lieuwen ............ F23D 14/725 60/39.091 |
| 7,743,599 | B2 | 6/2010 | Taware et al. |
| 7,765,873 | B2 | 8/2010 | Klosinski |
| 7,853,433 | B2 | 12/2010 | He et al. |
| 7,861,544 | B2 | 1/2011 | Ferreira et al. |

(Continued)

FOREIGN PATENT DOCUMENTS

| WO | 2012009024 A1 | 1/2012 |
| WO | 2013127993 A1 | 9/2013 |

OTHER PUBLICATIONS

"MyFleet Plant Performance Monitoring Solution Empowers Plant Operators to Make Smater Decisions;" GE; Jun. 8, 2011; http://www.genewsroom.com/Press-Releases/MyFleet-Plant-Performance-Monitoring-Solution-Empowers-Plant-Operators-to-Make-Smarter-Decisions-219685.

*Primary Examiner* — John Olszewski
*Assistant Examiner* — Navid Ziaeianmehdizadeh
(74) *Attorney, Agent, or Firm* — Fletcher Yoder, P.C.

(57) ABSTRACT

A monitoring system for a gas turbine includes a processor configured to receive an operating signal indicating an operating parameter of the gas turbine. The processor is configured to predict an occurrence of a lean blowout (LBO) event based on the operating parameter and an entropy ratio of combustion dynamics associated with a combustor of the gas turbine, wherein the LBO event corresponds to when the combustor stops firing. The processor is configured to send an alarm signal indicating the predicted LBO event to an electronic device prior to the occurrence of the LBO event.

15 Claims, 5 Drawing Sheets

(56) References Cited

U.S. PATENT DOCUMENTS

| | | |
|---|---|---|
| 8,000,930 B2 | 8/2011 | Poncet et al. |
| 8,370,046 B2 | 2/2013 | Jiang et al. |
| 8,475,110 B2 | 7/2013 | Hefner et al. |
| 8,762,379 B2 | 6/2014 | Birdwell et al. |
| 8,775,427 B2 | 7/2014 | Birdwell et al. |
| 8,775,428 B2 | 7/2014 | Birdwell et al. |
| 8,825,567 B2 | 9/2014 | Jiang et al. |
| 2001/0032452 A1* | 10/2001 | Kamen ............. F02G 1/044 60/39.6 |
| 2004/0016445 A1 | 1/2004 | Koch et al. |
| 2006/0042261 A1* | 3/2006 | Taware ............. F23N 5/003 60/773 |
| 2006/0075683 A1 | 4/2006 | Klein et al. |
| 2007/0056290 A1* | 3/2007 | Dahm ............... F02K 7/16 60/767 |
| 2008/0250769 A1 | 10/2008 | Wagner et al. |
| 2010/0266742 A1 | 10/2010 | Ferreira et al. |
| 2013/0042642 A1 | 2/2013 | Ferreira et al. |
| 2014/0008206 A1 | 1/2014 | Miller et al. |
| 2014/0277789 A1* | 9/2014 | Stuttaford ......... G05B 15/02 700/287 |
| 2014/0278241 A1 | 9/2014 | Jiang et al. |
| 2015/0101401 A1 | 4/2015 | Ekanayake et al. |
| 2015/0106059 A1 | 4/2015 | Ekanayake et al. |
| 2016/0273767 A1* | 9/2016 | Unni ............... F23N 5/242 |
| 2017/0115182 A1* | 4/2017 | Moore ............. G01M 15/14 |

\* cited by examiner

SYSTEM AND METHOD TO ENHANCE LEAN BLOWOUT MONITORING

BACKGROUND

The subject matter disclosed herein relates to turbomachinery, and more particularly, to monitoring turbine performance.

In power generation systems, turbines, such as gas turbines, or steam turbines, may convert fuel and air (e.g., an oxidant) into rotational energy. For example, a gas turbine may compress the air, via a compressor, and mix the compressed air with the fuel to form an air-fuel mixture. A combustor of the gas turbine may then combust the air-fuel mixture and use energy from the combustion process to rotate one or more turbine blades, thereby generating rotational energy. The rotational energy may then be converted into electricity, via a generator, to be provided to a power grid, a vehicle, or another load.

During operation, a ratio between the air and the fuel entering the gas turbine may be controlled to balance performance and emissions. If the gas turbine operates at a point where the ratio includes more air and/or less fuel than desired (i.e. the gas turbine operates too lean), then there is an increased likelihood of what is referred to as a lean blowout (LBO) where the combustor stops firing, thereby resulting in an outage. Further, during the lean blowout, the engine may be restarted to begin operating again, resulting in customers without power during the restart.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the embodiments. Indeed, the embodiments may encompass a variety of forms that may be similar to or different from the embodiments set forth below.

In a first embodiment, a monitoring system for a gas turbine includes a processor configured to receive an operating signal indicating an operating parameter of the gas turbine, predict an occurrence of a lean blowout (LBO) event based on the operating parameter and an entropy ratio of combustion dynamics associated with a combustor of the gas turbine, wherein the LBO event corresponds to when the combustor stops firing, and send an alarm signal indicating the predicted LBO event to an electronic device prior to the occurrence of the LBO event.

In a second embodiment, a method includes receiving, via a processor, an operating signal indicating an operating parameter of a gas turbine, predicting, via the processor, an occurrence of a lean blowout (LBO) event based on the operating parameter and an entropy ratio of combustion dynamics associated with a combustor of the gas turbine, wherein the LBO event corresponds to when the gas turbine stops firing, and sending, via the processor, an alarm signal indicating the predicted LBO event to an electronic device prior to the occurrence of the LBO event.

In a third embodiment, a non-transitory computer readable medium includes instructions configured to be executed by a processor of a monitoring system of a gas turbine, wherein the instructions include instructions configured to cause the processor to receive an operating signal indicating an operating parameter of the gas turbine, predict an occurrence of a lean blowout (LBO) event based on the operating parameter and an entropy ratio of combustion dynamics associated with a combustor of the gas turbine, wherein the LBO event corresponds to when the combustor stops firing, and send an alarm signal indicating the predicted LBO event to an electronic device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
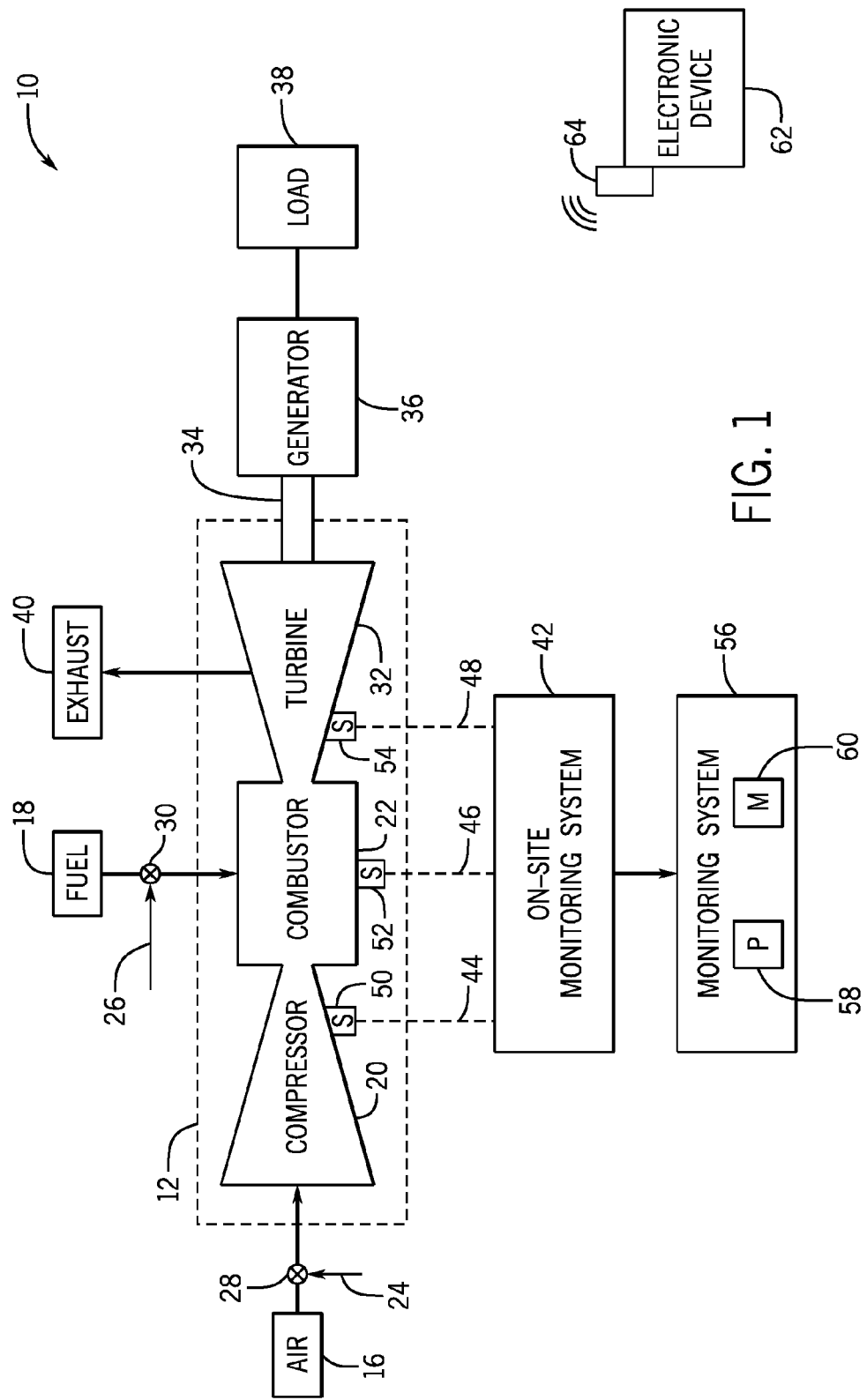
FIG. 1 is a block diagram of a gas turbine system having a monitoring system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to monitoring systems for turbomachinery, such as gas turbines. For example, a gas turbine may include one or more compressors, a combustor, and one or more turbine blades. The one or more compressors may receive air adjacent to the compressor and compress the air to be mixed with a fuel to form an air-fuel mixture. The combustor may then combust the air-fuel mixture and use energy from the combustion process to rotate rotors of the one or more turbines. Further the one or more turbines may be coupled to a shaft that rotates due to rotation of the one or more turbines. The rotational energy of the shaft may be converted (e.g., via a generator) into electrical energy to provide electricity to one or more loads.

The gas turbine may be controlled to balance performance and emissions by controlling a ratio between the air and the fuel entering the gas turbine with respect to a target ratio. For example, a lean mixture may have more air and less fuel than the target ratio. Conversely, a rich mixture may have more fuel and less air than the target ratio. As technology has improved, gas turbines have tended to run with leaner mixtures (i.e., more air and less fuel) to improve emissions, efficiencies, and/or dynamics of the gas turbine. However, running with a leaner mixture may cause increasing problems of lean blowouts (LBO). If the gas turbine runs too lean (i.e., too much air and/or not enough fuel in the air fuel mixture), there is an increased likelihood of a lean blowout in the combustor where the gas combustor stops firing, thereby resulting in an outage. Further, lean blowouts may impact unit operability.

Accordingly, the gas turbine system may include a monitoring system that monitors and prevents lean blowouts from occurring, thereby reducing outages. The monitoring system may receive a signal indicating an operating parameter of the gas turbine system. The monitoring system may then construct a predictive model based on the operating parameter. The monitoring system may predict a likelihood of a trip and/or a probability of forced outage due to a lean blowout of the combustor based on the predictive model.

By way of introduction, FIG. 1 shows a diagram of a gas turbine system 10 that includes a gas turbine 12. The gas turbine 12 may receive air 16 or another oxidant, such as oxygen, oxygen-enriched air, or oxygen-reduced air, and a fuel 18. The air 16 may be from outside the gas turbine 12, such as air adjacent to the gas turbine system 10. The air 16 may enter one or more compressors 20. While one compressor 20 is shown in FIG. 1 as an example, two, three, or more compressors may be used. For example, a three compressor system may include a low pressure compressor, an intermediate pressure compressor, and a high pressure compressor that are coupled to each other to further compress the air 16 and provide compressed air for the combustion process.

The air 16 and the fuel 18 may be mixed to create an air-fuel mixture to be combusted in a combustor 22. A ratio between the air 16 and the fuel 18 entering the combustor 22 may be controlled to meet a target ratio. For example, a control system of the gas turbine 12 may send one or more signals 24 and 26 to valves 28 and 30. While valves 28 and 30 are shown in FIG. 1, these are merely examples, and any control suitable for controlling air 16 and fuel 18 may be used, such as valves, pumps, motors, solenoids, or the like.

The combusted air-fuel mixture may then apply a force to rotate a rotor of a turbine 32. While one turbine 32 is shown in FIG. 1 as an example, the gas turbine system 10 may include two, three, or more turbines 32. The turbine 32 may be operatively coupled to a shaft 34 that rotates as the rotor of the turbine 32 rotates. The rotational energy of the shaft 34 may then be converted to electricity via a generator 36, to provide electricity to one or more loads 38. The combusted air-fuel mixture may then be released as exhaust 40 from the gas turbine system 10.

The gas turbine system 10 may include an on-site monitoring (OSM) system 42 that receives signals 44, 46, and 48 from respective sensors 50, 52, and 54 on the compressor 20, the combustor 22, and the turbine 32. The signals 44, 46, and 48 may indicate various operating parameters related to the gas turbine 12. For example, the operating parameters may include generator power, generator frequency, generator power factor, ambient temperature, ambient pressure, fuel temperature, compressor inlet air flow, turbine speed, or the like. The OSM system 42 may send the data from the signals 44, 46, 48 to a monitoring system 56. The monitoring system 56 may be a remote monitoring system, for example, on a cloud-based platform. For instance, the monitoring system 56 may receive data from one or more OSM systems 42. The OSM systems 42 may be associated with one or more assets (e.g., equipment located at or in proximity to the gas turbine system), such as the gas turbine 12. Further, multiple OSM systems 42 may provide the monitoring system 56 with fleet-wide data of assets at multiple locations as well as data related to each customer. While the monitoring system 56 is shown as separate from the OSM system 42 in FIG. 1, this is merely an example. In other embodiments, the signals 44, 46, and 48 may be received and processed by the monitoring system 56 directly or indirectly from another electronic device.

The monitoring system 56 and/or the OSM system 42 may send signals to an electronic device 62 that may be located at the location of the gas turbine system 10 or at another location. For example, the electronic device 62 may be a computer, laptop, smartphone, tablet, or the like. Further, the electronic device 62 may communicate with the monitoring system 56 and/or the OSM system 42 via a transceiver 64, a wired connection (e.g., Ethernet), or wirelessly routed via a router. For instance, an operator may use the electronic device 62 to see reports, alarms, advisory actions, or visualizations generated by the monitoring system 56 and/or the OSM system 42.

The monitoring system 56 may be a cloud-based system that indicates one or more alerts related to the lean blowout (LBO), where the alerts are based on prior data and operating parameters of the gas turbine 12. The monitoring system 56 may include a processor 58 and memory 60. The processor 58 will be used throughout this disclosure, although as one of ordinary skill in the art will appreciate, multiple processors may be used by the monitoring system 56. The OSM system 42 and/or the electronic device 62 may each include similar hardware (e.g., processor and memory) as described below with respect to the monitoring system 56. The processor 58 may be operatively coupled to the memory 60 to execute instructions for carrying out the presently disclosed techniques. These instructions may be encoded in programs or code stored in a tangible non-transitory computer-readable medium, such as the memory 60 and/or other storage devices. The processor 58 may be a general purpose processor (e.g., processor of a desktop/laptop computer), system-on-chip (SoC) device, application-specific integrated circuit, or some other processor configuration. The memory 60, in the embodiment, includes a computer readable medium, such as, without limitation, a hard disk drive, solid state drive, diskette, flash drive, compact disc (CD), digital video disc (DVD), random access memory (RAM), and/or any suitable storage device that enables the processor 58 to store, retrieve, and/or execute instructions and/or data. The memory 60 may include one or more local and/or remote storage devices.

Figure 2:
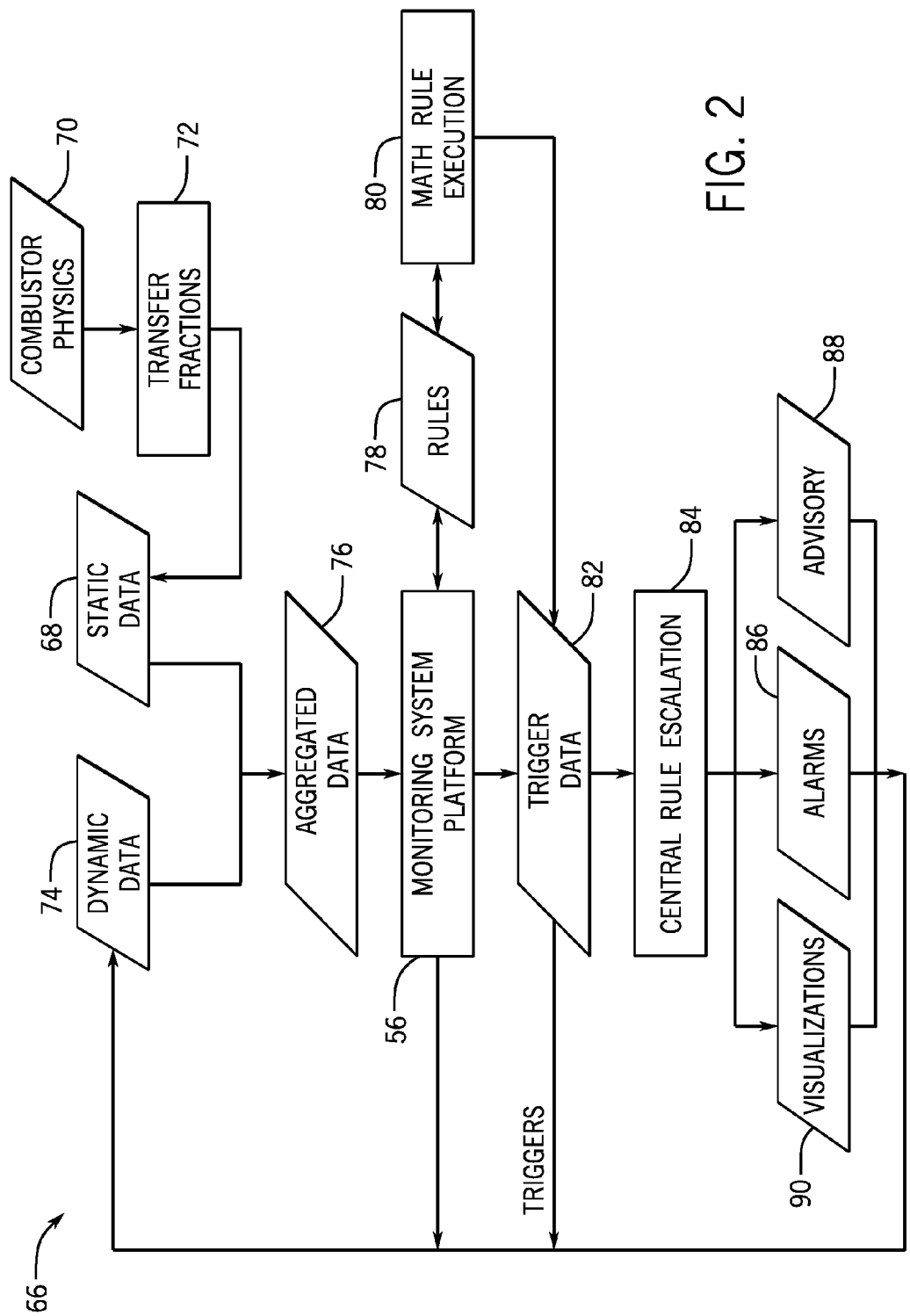
FIG. 2 is a block diagram of data flow chart performed by the monitoring system of FIG. 1, in accordance with an embodiment.

FIG. 2 is a data flow diagram of a process 66 performed by the monitoring system 56 of the gas turbine system 10. The processor 58 may begin by receiving static data 68, such as asset configuration data (e.g., a type of one or more parts of the turbine 32, location of the turbine, and/or fleet-wide data). For example, the static data 68 may include prior performance data of the gas turbine system 10, international standard organization (ISO) conditions, design conditions, and/or certain accessories available for the gas turbine system 10. Further, the processor 58 may receive data related to combustor physics 70 that define expected operation of the combustor 22 based on the physical characteristics of the combustor 22. The static data 68 may include transfer functions 72 calculated from the combustor physics 70 that describe the ratio of the output of the system with respect to the input of the system. That is, the transfer functions may describe how the air and fuel entering the combustor 22 is related to the energy produced in the combustion process based on the physics of the combustor 22, such as the size and/or materials of the combustor 22. For example, frame temperatures of the combustor 22 may be calculated from model-based control (MBC) physics-based transfer function based on compressor discharge temperatures. While this example may involve an MBC combustor, the methods described below shall apply to any type of combustor (MBC or non-MBC units). Further, the static data 68 may include correction curves, periodic testing data, baseline reference data, rated conditions, fleet-wide degradation curves, cycle deck configurations, or the like.

The processor 58 may also receive dynamic data 74, such as the OSM data from the sensors 50, 52, and 54 indicating performance and/or efficiency of the compressor 20, the combustor 22, and/or the turbine 32. Dynamic data 74 may include ambient conditions (e.g., temperature, pressure, humidity), efficiency (e.g., power generated for a given amount of fuel and/or air), inlet system conditions (e.g., temperature, pressure, bleed), compressor parameters (e.g., pressure flow), fuel flow and power output, and/or steam injection conditions located on the OSM system 42.

The processor 58 may aggregate the received static data 68 and dynamic data 74 as aggregated data 76. Further, the processor 58 may obtain one or more rules 78 based on dynamic data that includes OSM data from previous operations (e.g., previous LBO events or other combustor operations), referred to as historical data. For instance, a MATLAB® rule execution system 80 may identify correlations between types of the aggregated data 76, and the monitoring system 56 may determine whether any rules 78 have been violated. As explained below, the monitoring system 56 may then, via the processor 58, obtain the aggregated data 76 and predict a likelihood of a trip due to LBO and/or a probability of forced outage due to LBO based on the dynamic data 74 and/or the static data 68. That is, the monitoring system 56 may analyze the dynamic data 74 in view of the rules 78. As explained below, the monitoring system 56 may determine, via the rules 78, that certain changes related to disorder of a thermodynamic system may be indicative of LBO events. As such, the MATLAB® rule execution system 80 may establish rules 78 (e.g., thresholds) related to the disorder of the thermodynamics of the gas turbine system 10.

The processor 58 may identify a trigger 82, or dynamic data 74 that exceeds the thresholds of the one or more rules 78. The trigger 82 may include dynamic data 74 compared with respect to a baseline value established from models and/or algorithms. Additional and/or alternatively, the trigger 82 may be received from the MATLAB® rule execution system 80 directly.

The processor 58 may utilize the trigger data 82 to identify rules 78 to send to central rule escalation 84 when the rules 78 are violated. For instance, depending on the rule 78 and/or the trigger 82, the processor 58 may generate an alarm 86, provide advisory information 88, provide visualizations 90 or otherwise inform an operator of the violated rule 78. For example, after the LBO pattern is detected based on the changes in the disorder of the thermodynamic system and an event confirmed in advance, the processor 56 may provide advisory information 88 recommending retuning as a corrective action.

The trigger 82 (e.g., operating parameters of the gas turbine 12 that violate the rules 78) and/or the rules 78 may be stored as dynamic data 74 on the OSM system 42. Alternatively and/or additionally, the rules 78 may be provided as a visualization 90 to the operator. For example, the processor 58 may generate reports related to fleet-wide comparisons, event statistics, input trends, output trends, or the like. The visualization 90 may include the trigger 82, the rules 78, and the dynamic data 74 used in the comparisons. The visualization 90 may be stored with the dynamic data 74.

As described in detail below, the monitoring system 56 may predict an LBO event by developing one or more models based on previously received OSM data. Further, the processor 58 may then apply one or more rules 78 to the OSM data and, if a rule 78 is violated, escalate the violated rule 78 by generating an alarm 86 or advisory information 88, such as recommendations for corrective actions.

Figure 3:
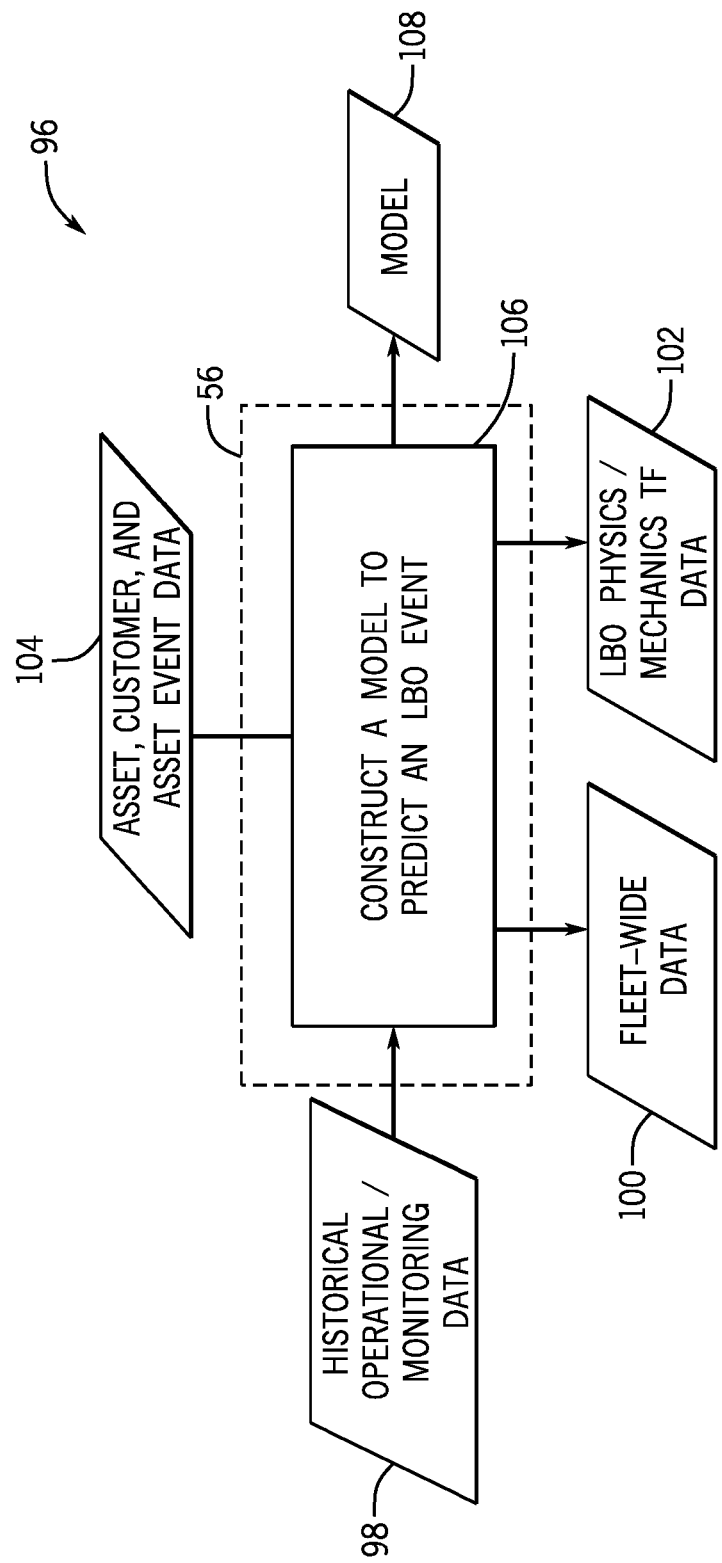
FIG. 3 is another block diagram of data flow chart performed by the monitoring system of FIG. 1, in accordance with an embodiment.

FIG. 3 is a data flow diagram showing a process 96 performed by the processor 58 of the monitoring system 56 to construct a model for predicting a lean blowout (LBO) event. As explained above, an LBO event may be an occurrence where the combustor 22 of the gas turbine 12 runs too lean (i.e., too much air and/or not enough fuel in the air-fuel mixture) such that the combustor 22 stops firing, thereby resulting in an outage. To predict LBO events, the processor 58 may receive data of various types, such as historical operational/monitoring data, fleet-wide data, LBO event physics data, and/or asset, customer, and asset event data.

Referring now to the process 96 of FIG. 3, the processor 58 may receive historical combustor operational/monitoring data 98 of the operating parameters of the gas turbine system 10, such as OSM data of prior occurrences of events. That is, the operational/monitoring data may include generator watts, generator frequency, generator power factor, ambient temperature, ambient pressure, fuel temperature, compressor inlet air flow, turbine speed before, during and/or after prior LBO events, and other data that may be related to the operation of the gas turbine system 10. The processor 58 may use the historical operational/monitoring data as a baseline for establishing correlations between prior LBO occurrences and operational data. As explained above, the operational data may be data from sensors 50, 52, and 54 of the OSM system 42.

The processor 58 may also receive fleet-wide data 100 related to operation of multiple assets across multiple sites. The fleet-wide data may include OSM data from other locations. As an example, fleet-wide data 100 may include average efficiency levels of a set of engines at various times.

The processor 58 may then receive event physics data 102. That is, data used in calculations based on the physics of the gas turbine system 10. For instance, event physics data may include the thermodynamic modeling variables. Further, the event physics data may include the physics-based transfer functions available for MBC based combustors 22.

The processor 58 may receive asset, customer, and asset event data 104. Asset data may include maintenance data related to when an operator has performed a cleaning, water wash, testing, or the like. Customer data may include data related to how each customer of each asset has configured the gas turbine system 10 for operation. For example, the customer data may include types of combustors or turbines used, a frequency in which the turbine is operating, types of fuel 18 used by the gas turbine system 10, or the like. Further, the processor 58 may receive asset event data of various prior events that are related to the gas turbine system 10. For example, asset event data may include data related to prior occurrences of combustor LBO events, efficiency of the gas turbine system 10 when the last outage occurred, or the like.

The processor 58 may then construct a model 108 to predict LBO events 106 based on the operational data 98, fleet-wide data 100, LBO physics 102, asset, customer, and asset event data 104, and the like. For example, the processor 58 may perform principal component analysis of the various groups of data to extract entropy features that are used to construct a model, as described in detail with respect to FIGS. 5 and 6.

Figure 4:
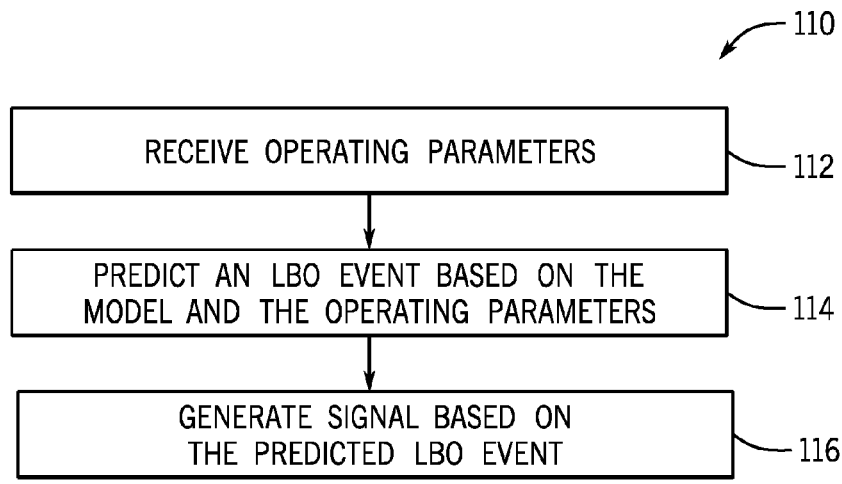
FIG. 4 is a flow diagram of a method to generate a signal for notifying an operator regarding a predicted LBO event of the gas turbine system of FIG. 1, in accordance with an embodiment.

FIG. 4 is a process 110 performed by the processor 58 to generate an alarm 86 based on the predicted LBO event 106. At block 112, the processor 58 may begin by receiving operating parameters of a gas turbine 12. For example, the operating parameters may be current operating parameters in real time or near-real time (e.g., the last minute, five minutes, hour, etc.) from the OSM system 42, as compared to the historical operational/monitoring data of block 98 from prior weeks, months, and/or years.

At block 114, the processor 58 may predict whether an LBO event is likely to occur based on the model 108 and the operating parameters. That is, the processor 58 may apply the real time data to the model 108 based on historical fleet-wide, physics, asset, customer, and asset event data to predict the LBO event. The predicted LBO event may include a likelihood of a trip due to the air-fuel ratio entering the combustor 22, a probability of forced outage due to the LBO event in the combustor 22, when the LBO event is likely to occur, or the like.

At block 116, the processor 58, may then generate an alarm signal based on the predicted LBO event, as described with respect to the alarm 86 of FIG. 2. The alarm 86 may include advisory information 88 related to corrective actions that an operator may perform to prevent the LBO event, visualizations 90 related to data indicative of the predicted LBO event, or the like. For example, the alarm 86 may indicate generator output that suggests that an LBO event is likely to occur. The signal may include displaying ranked predictions by the monitoring system 56, a level of LBO event predicted to occur, and an outage plan associated with the LBO event.

As explained in above in the discussion related to FIG. 2, the processor 58 may send the alarm signal to the electronic device 62 indicating the predicted LBO event, the violation of the rule 78, the advisory information 88, reports, visualizations 90, or the like. For example, the processor 58 may communicate the occurrence of the LBO event to the electronic device 62 via email, phone, or web services. The site operators may then access the emails, phone, or web services to inspect the event, the rules, the advisory information, reports, visualizations, or the like.

Figure 5:
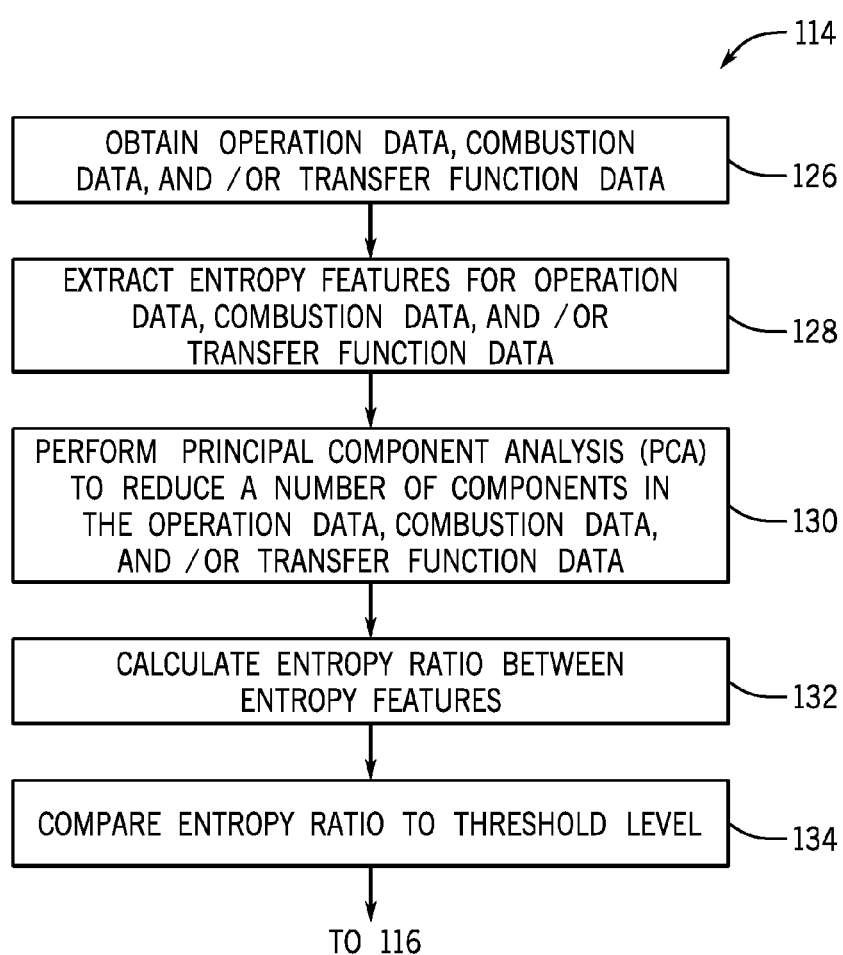
FIG. 5 is a flow diagram of a method performed by the monitoring system of FIG. 1 to predict the LBO event of FIG. 4 based on operating parameters of the gas turbine system of FIG. 1, in accordance with an embodiment.

FIG. 5 is a flowchart of a process performed by the processor 58 for predicting the LBO event at block 114 of FIG. 4. At block 126, the processor 58 may begin by obtaining and/or filtering the operating parameters to where generator output is greater than a threshold value (e.g., to remove data from when the turbine is starting/stopping). Further, the operating parameters may be grouped based on the type of data that is represented by the operating parameters. For example, the operating parameters related to operation data, combustion dynamics data, and transfer function calculations may be grouped separately. Operating data may include operating parameters such as generator output, generator frequency, fuel gas temperature, compressor inlet temperature, compressor pressure ratio, or the like. Combustion dynamic data may include combustion dynamics amplitude blowout band (CDAB), combustion dynamics amplitude high band (CDAH), combustion dynamics amplitude low band (CDAL), or the like. Transfer function calculations may include calculated combustion frame metal temperatures at one or more locations (e.g., TMP0, TMP1, TMP2, TMP3, etc.) in degrees and the like. The processor 58 may calculate values of one or more MBC physics-based transfer functions.

At block 128, the monitoring system 56 may find one or more entropy features and determine an entropy ratio between the one or more features. Entropy, a measure of disorder in a thermodynamic system, such as the combustor 22, may be a precursor to LBO. Entropy is extracted as a feature from principal components to detect the possible change of disorder of combustion. While entropy of an isolated system may not decrease, combustion may not be an isolated system. As such, entropy may vary over time and an outlier may be an indicator of an anomaly that suggests an LBO event. Further, wavelet analysis may be a process used to extract information from the components via a set of wave-like oscillation functions. Multiscale resolution analysis is conducted to extract the detailed and approximate components from the raw signal by decomposing the raw signal into different resolutions.

Each of the operating parameters described above acts as an additional variable to predicting LBO events. As such, it is desirable to reduce the number of variables to simplify predicting LBO events. At block, 130, the processor 58 may perform wavelet-based multi-scale principal component analysis (PCA) to extract a majority (e.g., 95%) of information in terms of independent principal components from multiple variables. As described below, the operation data, combustion dynamics data, and transfer function calculations may be referred to as components of the principal component analysis. By reducing the number of components, via PCA, the disorder of the system may be easier to identify and the disorder may be associated with LBO events. As such, the processor 58 may take a larger number of operating parameter values (e.g., the operation data group, the combustion dynamics group, the transfer function calculation group) that have correlations with one another and transform, via PCA, the larger number of operating parameters into a smaller number of uncorrelated lower dimensional variables. That is, the processor 58 may utilize PCA to produce principal components that correspond to linear combinations of operating parameters of the gas turbine 12.

The principal components may be orthogonal to one another and have more variance of information with respect to one another as compared to utilizing the operating parameters to enable the processor 58 to analyze entropy using fewer and less correlated variables as compared to the operating parameters.

TABLE 1

| Principal components of operation data | | |
|---|---|---|
| Operating data | PC1 (65%) | PC2 (35%) |
| Generator Output | 15% | 20% |
| Fuel Gas temperature | 25% | 5% |
| Compressor inlet temperature | 15% | 5% |

As shown in Table 1, the processor 58, via PCA, may weigh operation data such that the orthogonality and variance of the principal components are greater than (e.g., maximized) the orthogonality and variance of the operating parameters, thereby improving the independence of the variables. While these factors are shown in Table 1, any suitable operating parameters may be used. Similarly, the process described with respect to block 130 may be repeated to extract entropy features related to combustion dynamics data received from the OSM system 42 that indicate operating parameters of the combustor 22 during the combustion process (e.g., in non-MBC combustors 22). Alternatively and/or additionally, the processor 58 may extract entropy features from the operating parameters by performing PCA on the MBC transfer function calculations. While PCA is described in detail, the systems and methods may include frequency analysis, wavelet multiscale resolution, artificial neural networks, deep learning, Random Forest, and Logistic Regression to recognize patterns that may enable prediction of a likelihood of LBO events.

At block 132, the processor 58 may calculate an entropy ratio between one or more entropy features. That is, the entropy ratio may be a level of disorder of the combustion dynamics of the combustor 22 as compared to a reference level of disorder. The entropy ratio may be a potential indicator of forecasting the LBO. Each of the operation data, the combustion dynamics data, and/or the transfer function calculation data from block 130 may be used in calculating the entropy ratio. For example, the processor 58 may determine a Shannon entropy ratio between principal components of the combustion dynamics and principal components of the operation data. Further, the processor 58 may integrate the transfer function calculation data (e.g., as additional principal components of combustion dynamics data) into the Shannon entropy ratio to improve detectability of anomalies indicative of future LBO events. Alternatively and/or additionally, the processor 58 may determine a p-order norm entropy between the combustion dynamics and operation data principal components.

At block 134, the processor 58 may then compare the entropy ratio to a threshold level. For example, the entropy ratio may be a preset value (e.g., combustion dynamics entropy to operation data entropy greater than 200) or set based on the fleet-wide data. The entropy ratio is a potential indicator of forecasting an LBO trip, in addition to existing thresholds or data checks. When the entropy ratio is greater than the threshold value, there may be an increased likelihood of a future LBO event. Further, depending on the entropy ratio, the processor 58 may generate a probabilistic. As such, the processor 58 may proceed to block 116 and generate an alarm signal based on the predicted LBO event.

Figure 6:
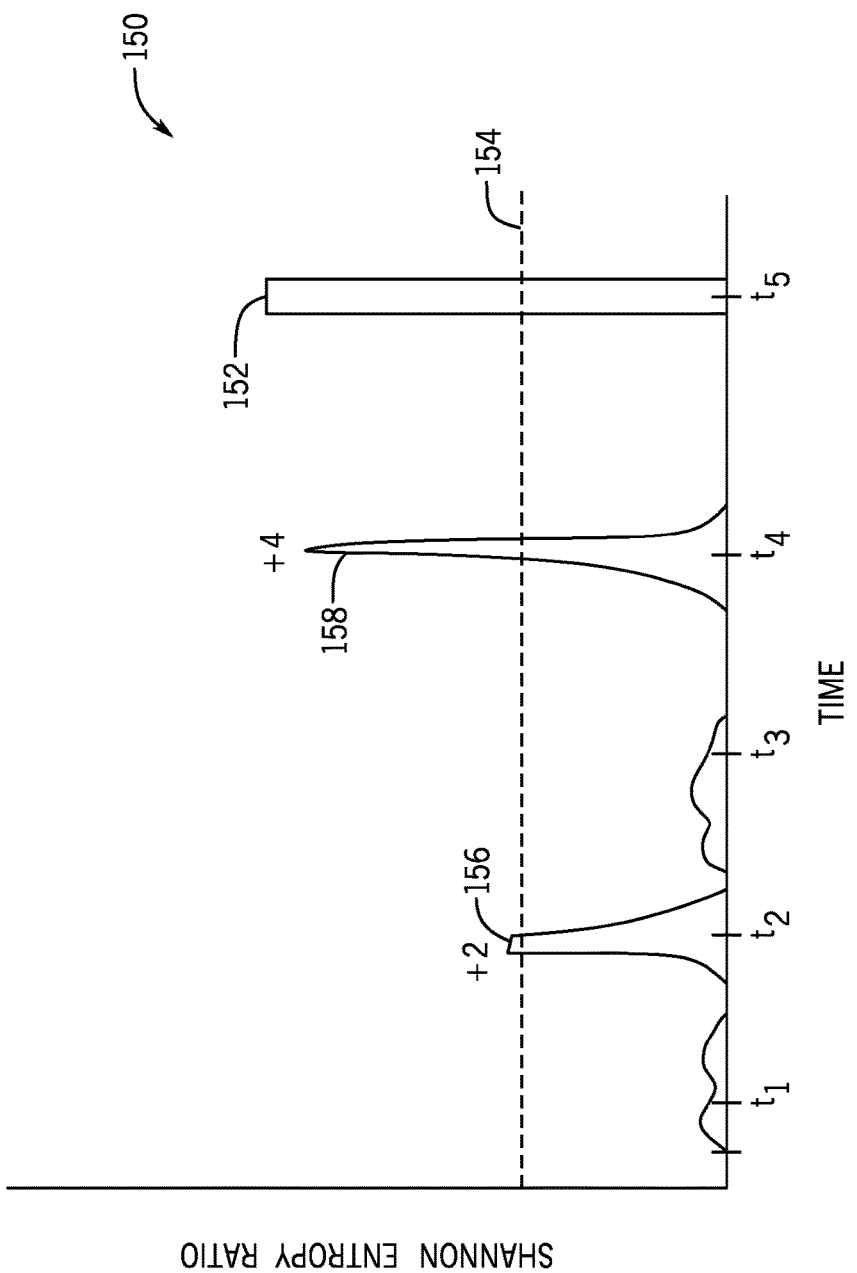
FIG. 6 is a graph of data received by the monitoring system of FIG. 1 to predict the LBO event, in accordance with an embodiment.

FIG. 6 is a graph 150 of the Shannon entropy ratio with respect to time where the entropy ratio is the combustion dynamics entropy values of the combustor 22 with respect to operating data entropy values, transfer function calculation entropy values, or both. The times of the graph 150 are shown as several days, weeks, or months prior to a predicted LBO event 152. The processor 58 receives the operating parameters of the gas turbine system 10 from the sensors 50, 52, and 54 via communication from the OSM system 42. Based on historical data, the processor 58 may establish a threshold 154 or receive a selection of the threshold 154 from an operator. That is, the processor 58 may detect a pattern between historical entropy ratio data and LBO events. Based on a pattern between the current entropy ratio data and historical entropy ratio data having historical occurrences of LBO events, the processor 58 may predict a future occurrence of an LBO event.

To predict an occurrence of an LBO event, the processor 58 may compare the entropy ratio to the threshold 154 periodically. At time t1, the entropy ratio is below the threshold 154 that may suggest a lower level of disorder than levels historically associated with LBO events. At time t2, the processor 58 may determine that the entropy ratio is greater than the threshold 154 at spike 156 indicating a level of disorder historically associated with LBO events. Depending on duration and/or magnitude, the processor 58 may assign a weight to the violation (e.g., +2 points) 156. At time t4, for example, a greater magnitude of the entropy ratio may be assigned a larger weight (e.g., +4 points) at spike 158 than spike 156. Based on the weights of the entropy ratio exceeding the threshold 154, the processor 58 may determine a likelihood of a predicted LBO event 152 in the future. For example, the processor 58 has determined that an LBO event is likely at time t5 due to the entropy ratio exceeding the threshold 154 indicating disorder that has historically occurred before LBO events. Further, the predicted LBO event 152 may include a severity and probability of the occurrence. As such, the processor 58 may send a signal to an electronic device 62 via email, text message, phone call, or web service for an operator to perform actions, such as combustor Dry Low NOx (DLN) tuning, sensor calibration, maintenance scheduling, hardware upgrades, or the like. In this manner, the processor 58 may send the alarm signal of an LBO event prior to the occurrence of the LBO event 152 to enable an operator to perform actions before the LBO event 152 occurs. For instance, the processor 58 may send the alarm signal of the LBO event 152 at approximately time t4 before the predicted LBO event occurs at time t5. In some embodiments, the processor 58 may send the signal to control operation of the gas turbine system based on the predicted LBO event.

In certain embodiments, the processor 64 may send a signal to control operation of the gas turbine system 10 based on the LBO event. For example, the processor 58 may send a signal to shut off the gas turbine system 10, to adjust fuel flow, to adjust the air-fuel ratio, or the like, based on the LBO event. For example, the processor 58 may send a signal to a controller of the gas turbine system 10 to cause the controller to adjust the air-fuel ratio based on the LBO event. In some embodiments, the processor 64 may send a signal to the electronic device to activate and display an application indicating the LBO event.

Technical effects of the disclosure include a monitoring system and method that send a signal to an electronic device indicating a lean blowout of a combustor of a gas turbine. The monitoring system may receive signals indicating operating parameters of a gas turbine, such as ambient temperature and generator output. The monitoring system may predict an occurrence of a lean blowout (LBO) event associated with unexpected behavior of a combustor of the gas turbine based on a pattern detected from the operating parameter. The monitoring system may send a signal to an electronic device indicating the predicted LBO event. For example, the monitoring system may send an alarm signal to a tablet or cell phone for an operator to perform a Dry Low Nox (DLN) tuning. By monitoring the gas turbine system in real time and notifying the operator, the processor may provide a post-solution activity in alerting the operator and/or controlling operation of the turbine based on predicted events and/or alerts by providing the alert on a display of an electronic device.

This written description uses examples to disclose the embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention clamed is:

1. A monitoring system for a gas turbine, comprising: a control system configured to:
   receive an operating signal indicating an operating parameter of the gas turbine;
   determine an entropy ratio of combustion dynamics by calculating a ratio between combustion dynamics entropy and system entropy based at least in part on a frame temperature of an interior of a combustor from a transfer function associated with one or more physical characteristics of the combustor, wherein the one or more physical characteristics comprise a combustor size, a combustor material, or both;
   predict an occurrence of a lean blowout (LBO) event based on the operating parameter and the entropy ratio of combustion dynamics associated with the combustor of the gas turbine, wherein the LBO event corresponds to when the combustor stops firing;
   send an alarm signal indicating the predicted LBO event to an electronic device prior to the occurrence of the LBO event; and
   adjust one or more operating parameters of the gas turbine based on the alarm signal.

2. The monitoring system of claim 1, wherein the control system is configured to predict the occurrence of the LBO based on a likelihood that the LBO will occur within a first amount of time.

3. The monitoring system of claim 1, wherein the control system is configured to predict the occurrence of the lean blowout event by comparing a threshold to the entropy ratio of combustion dynamics of the combustor.

4. The monitoring system of claim 1, wherein the control system is configured to compare the operating parameter to prior historical data associated with prior LBO events that occurred on one or more other gas turbines having similar properties as the gas turbine.

5. The monitoring system of claim 1, wherein the control system is configured to predict the occurrence of the LBO event by detecting a change in disorder of the combustion dynamics entropy associated with one or more operations of the combustor with respect to operation data entropy associated with one or more operations of the gas turbine.

6. The monitoring system of claim 1, wherein the control system is configured to predict the occurrence of the LBO event by weighing, via principal component analysis, the operating parameter and at least one other operating parameter to improve independence of variables to be utilized in predicting the occurrence.

7. The monitoring system of claim 1, wherein the control system is configured to perform wavelet analysis that extracts information related to the combustion dynamics.

8. A method, comprising:
   receiving, via a processor, an operating signal indicating an operating parameter of a gas turbine;
   determining, via the processor, an entropy ratio of combustion dynamics by calculating a ratio between combustion dynamics entropy and system entropy, wherein the system entropy is determined based at least in part on a frame temperature of an interior of a combustor from a transfer function associated with one or more physical characteristics of the combustor, wherein the one or more physical characteristics comprise a combustor size, a combustor material, or both;
   predicting, via the processor, an occurrence of a lean blowout (LBO) event based on the operating parameter and the entropy ratio of combustion dynamics associated with the combustor of the gas turbine, wherein the LBO event corresponds to when the gas turbine stops firing;
   sending, via the processor, an alarm signal indicating the predicted LBO event to an electronic device prior to the occurrence of the LBO event; and
   adjusting one or more operating parameters of the gas turbine based on the alarm signal.

9. The method of claim 8, wherein predicting the occurrence of the lean blowout event comprises comparing a threshold the entropy ratio of the combustor.

10. The method of claim 8, comprising recognizing a pattern between prior historical data and prior LBO events to predict when the LBO event is likely to occur, a severity of the LBO event, or both.

11. A non-transitory computer readable medium comprising instructions configured to be executed by a processor of a monitoring system of a gas turbine, wherein the instructions comprise instructions configured to cause the processor to:
   receive an operating signal indicating an operating parameter of the gas turbine;
   determine an entropy ratio of combustion dynamics by calculating a ratio between combustion dynamics entropy and system entropy based at least in part on a frame temperature of an interior of a combustor from a transfer function associated with one or more physical characteristics of the combustor, wherein the one or more physical characteristics comprise a combustor size, a combustor material, or both;
   predict an occurrence of a lean blowout (LBO) event based on the operating parameter and the entropy ratio of combustion dynamics associated with the combustor of the gas turbine,
   wherein the LBO event corresponds to when the combustor stops firing;
   send an alarm signal indicating the predicted LB0 event to an electronic device; and
   adjust one or more operating parameters of the gas turbine based on the alarm signal.

12. The non-transitory computer readable medium of claim 11, comprising instructions configured to cause the processor to predict the occurrence of the lean blowout event by comparing a threshold to the entropy ratio of combustion dynamics.

13. The non-transitory computer readable medium of claim 11, comprising instructions configured to cause the processor to predict the occurrence of the LBO based on a likelihood that the LBO will occur within a first amount of time.

14. The non-transitory computer readable medium of claim 11, comprising instructions configured to cause the processor to predict the occurrence of the LBO event by weighing, via principal component analysis, the operating parameter and at least one other operating parameter to improve independence of variables in the predicted occurrence.

15. The non-transitory computer readable medium of claim 11, comprising instructions configured to cause the processor to recognizing a pattern between prior historical data and prior LBO events to predict when the LBO event is likely to occur, a severity of the LBO event, or both.

* * * * *